(12) United States Patent
Okamoto et al.

(10) Patent No.: US 8,592,335 B2
(45) Date of Patent: Nov. 26, 2013

(54) DIELECTRIC CERAMIC COMPOSITION AND LAMINATED CERAMIC CAPACITOR

(75) Inventors: Takafumi Okamoto, Nagaokakyo (JP); Noriyuki Inoue, Nagaokakyo (JP); Hitoshi Nishimura, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/400,933

(22) Filed: Feb. 21, 2012

(65) Prior Publication Data

US 2012/0147524 A1 Jun. 14, 2012

Related U.S. Application Data

(63) Continuation of application No. PCT/JP2010/062302, filed on Jul. 22, 2010.

(30) Foreign Application Priority Data

Sep. 7, 2009 (JP) ................................ 2009-205543

(51) Int. Cl.
*C04B 35/468* (2006.01)

(52) U.S. Cl.
USPC .................... 501/139; 501/138; 361/321.4

(58) Field of Classification Search
USPC ................. 501/139, 138; 361/321.4
See application file for complete search history.

(56) References Cited

U.S. PATENT DOCUMENTS

| | | | |
|---|---|---|---|
| 5,822,176 A | 10/1998 | Sano et al. | |
| 6,489,257 B1 * | 12/2002 | Hiramatsu et al. | 501/135 |
| 6,960,547 B2 * | 11/2005 | Matoba et al. | 501/139 |
| 7,262,146 B2 * | 8/2007 | Ito et al. | 501/139 |
| 7,439,203 B2 | 10/2008 | Ito et al. | |
| 7,541,305 B2 * | 6/2009 | Ito et al. | 501/135 |
| 7,638,451 B2 | 12/2009 | Inoue et al. | |
| 7,790,645 B2 | 9/2010 | Seki et al. | |
| 7,795,663 B2 | 9/2010 | Suh et al. | |
| 2002/0137622 A1 * | 9/2002 | Tokita et al. | 501/137 |

(Continued)

FOREIGN PATENT DOCUMENTS

| | | |
|---|---|---|
| CN | 1326204 A | 12/2001 |
| CN | 1903788 A | 1/2007 |

(Continued)

OTHER PUBLICATIONS

Written Opinion of the International Searching Authority, mailed Aug. 31, 2010.

*Primary Examiner* — Karl Group
(74) *Attorney, Agent, or Firm* — Dickstein Shapiro LLP

(57) ABSTRACT

A dielectric ceramic composition contains a barium titanate based composite oxide as its main constituent, and contains a first accessory constituent including at least Al and a second accessory constituent including one or more elements selected from among Fe, Co, Ni, Cu, and Zn, wherein the content of the Al is 0.02 to 6 parts by mol with respect to 100 parts by mol of the main constituent, and the content ratio of the second accessory constituent to the Al is 0.01 to 0.4 in terms of mols. Dielectric layers are formed from a sintered body of the dielectric ceramic composition. The addition of various types of accessory elements such as rare-earth elements is possible, if necessary. This invention achieves a dielectric ceramic composition which is capable of ensuring favorable DC bias characteristics while ensuring high reliability, and a laminated ceramic capacitor using the dielectric ceramic composition.

21 Claims, 1 Drawing Sheet

(56) References Cited

U.S. PATENT DOCUMENTS

2006/0046921 A1* 3/2006 Ito et al. .................... 501/136
2012/0081836 A1* 4/2012 Yamaguchi ............... 361/321.4
2012/0113562 A1* 5/2012 Kang et al. ............... 361/321.2

FOREIGN PATENT DOCUMENTS

| | | |
|---|---|---|
| CN | 1983463 A | 6/2007 |
| CN | 101407417 A | 4/2009 |
| CN | 101489953 A | 7/2009 |
| EP | 737655 * | 10/1996 |
| JP | 63-265811 | 2/1988 |
| JP | 64-069514 | 3/1989 |
| JP | 05-017212 | 1/1993 |
| JP | 05-043313 | 2/1993 |
| JP | 10139538 * | 5/1998 |
| JP | 2006-342025 A | 12/2006 |

* cited by examiner

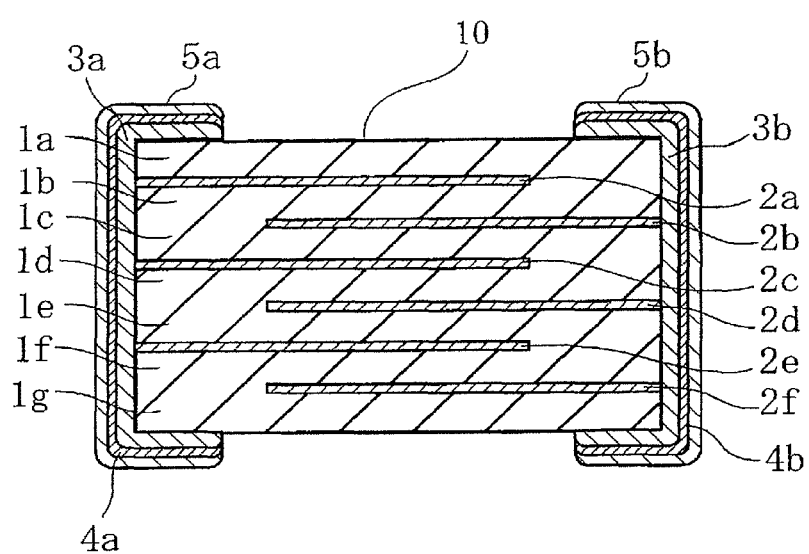

US 8,592,335 B2

DIELECTRIC CERAMIC COMPOSITION AND LAMINATED CERAMIC CAPACITOR

This is a continuation of application Serial Number PCT/JP2010/062302, filed Jul. 22, 2010, the entire contents of which is incorporated herein by reference.

TECHNICAL FIELD

The present invention relates to a dielectric ceramic composition, and a laminated ceramic capacitor using the same.

BACKGROUND ART

As dielectric ceramic compositions for high-dielectric-constant laminated ceramic capacitors, dielectric ceramic compositions containing $BaTiO_3$ as their main constituent have been known, to which various types of accessory constituents such as rare-earth elements are added depending on characteristics required.

For example, Patent Document 1 proposes a dielectric ceramic composition containing barium titanate as its main constituent, and containing, as its accessory constituents, MgO, a sintering aid, at least one material selected from $V_2O_5$, $MoO_3$, and $WO_3$, a specific rare-earth oxide, $CaZrO_3$ or $CaO+ZrO_2$, MnO or $Cr_2O_3$, and $Al_2O_3$, in which with respect to 100 parts by mol of the main constituent, MgO is 0.2 to 0.75 parts by mol, Mn or Cr is 0.1 to 0.3 parts by mol, and $Al_2O_3$ is 0.5 to 4 parts by mol (provided that 4 parts by mol is excluded), and Mg, Mn and Cr satisfies a relationship of $0.3 \le (Mn+Cr)/Mg \le 0.5$.

In Patent Document 1, Al is added to the main constituent including barium titanate in addition to the rare-earth element, Mn, and Mn, thereby in an attempt to achieve a high dielectric constant and high reliability (lifetime characteristics).

PRIOR ART DOCUMENTS

Patent Document

Patent Document 1: Japanese Patent Application Laid-Open No. 2006-342025

DISCLOSURE OF THE INVENTION

Problem to be Solved by the Invention

In the case of using the dielectric ceramic composition in Patent Document 1 under an environment in which a DC bias is applied, there is the problem of a significant decrease in the dielectric constant due to the DC bias, resulting in degraded DC bias characteristics, even when reliability can be ensured.

The present invention has been achieved in view of these circumstances, and an object of the present invention is to provide a dielectric ceramic composition which is capable of ensuring favorable DC bias characteristics while ensuring high reliability, and a laminated ceramic capacitor using the dielectric ceramic composition.

Means for Solving the Problem

The present inventors have carried out earnest research in order to achieve the object mentioned above, and found that in addition to a predetermined amount of Al, at least one element selected from among Fe, Co, Ni, Cu, and Zn are added to a barium titanate based composite oxide so that the content ratio between these elements and the Al is a predetermined ratio, thereby making it possible to suppress a decrease in dielectric constant and ensure high reliability even when a DC bias is applied.

The present invention has been achieved based on this finding, and a dielectric ceramic composition according to the present invention contains a $BaTiO_3$ based composite oxide as its main constituent, and contains a first accessory constituent including at least Al and a second accessory constituent including one or more elements selected from among Fe, Co, Ni, Cu, and Zn, wherein the content of the Al is 0.02 to 6 parts by mol with respect to 100 parts by mol of the main constituent, and the content ratio of the second accessory constituent to the Al is 0.01 to 0.4 in terms of molar amounts.

In addition, the dielectric ceramic composition according to the present invention preferably contains a rare-earth element.

In the dielectric ceramic composition according to the present invention, at least one of La, Ce, Pr, Nd, Sm, Eu, Gd, Tb, Dy, Y, Ho, Er, Tm, Yb, and Lu is preferably used for the rare-earth element.

In addition, a portion of Ba constituting the main constituent is preferably substituted with at least of Ca and Sr in the dielectric ceramic composition according to the present invention.

Furthermore, a portion of Ti constituting the main constituent is preferably substituted with at least one of Zr and Hf in the dielectric ceramic composition according to the present invention.

In addition, the compounding molar ratio between the Ba site and the Ti site constituting the main constituent is preferably 0.995 to 1.03 in the dielectric ceramic composition according to the present invention.

A laminated ceramic capacitor according to the present invention has a ceramic body including dielectric layers and internal electrodes stacked alternately, and external electrodes formed on ends of the ceramic body and electrically connected to the internal electrodes, wherein the dielectric layers are formed from a sintered body of the dielectric ceramic composition described above.

Advantages of the Invention

The dielectric ceramic composition according to the present invention contains a $BaTiO_3$ based composite oxide as its main constituent, and contains a first accessory constituent including at least Al and a second accessory constituent including one or more elements selected from among Fe, Co, Ni, Cu, and Zn, wherein the content of the Al is 0.02 to 6 parts by mol with respect to 100 parts mol of the main constituent, and the content ratio of the second accessory constituent to the Al is 0.01 to 0.4 in terms of molar amounts. Thus, even when a DC bias is applied, a decrease in dielectric constant can be suppressed, and high reliability can be ensured.

In the laminated ceramic capacitor according to the present invention, the dielectric layers are formed from a sintered body of the dielectric ceramic composition. Thus, a laminated ceramic capacitor can be obtained which is capable of achieving a balance between DC bias characteristics and reliability.

Specifically, the achievement of a laminated ceramic capacitor with high reliability which can suppress the rate of capacitance change of electrostatic capacitance within 60% even when a direct-current voltage of 10 V is applied is made possible, and which causes no failures or provides an extremely low rate of failure occurrence even when a voltage of DC 40 V is applied continuously for a long period of 1500 hours under a high temperature of 125° C.

BRIEF EXPLANATION OF DRAWINGS

The sole FIGURE is a cross-sectional view illustrating an embodiment of a laminated ceramic capacitor manufactured with the use of a dielectric ceramic composition according to the present invention.

BEST MODE FOR CARRYING OUT THE INVENTION

Next, an embodiment of the present invention will be described in detail.

The dielectric ceramic composition as an embodiment of the present invention is represented by the following general formula (A).

$$100Ba_mTiO_3+(\alpha/2)Al_2O_3+\beta MO_x \qquad (A)$$

where M represents one or more elements selected from among Fe, Co, Ni, Cu, and Zn, x represents a positive number unambiguously determined by the valence of M. and m from 0.995 to 1.03.

In addition, $\alpha$ and $\beta$ satisfy the formulas (1) and (2).

$$0.02 \leq \alpha \leq 6 \qquad (1)$$

$$0.01 \leq \beta/\alpha \leq 0.4 \qquad (2)$$

More specifically, the dielectric ceramic composition contains a barium titanate based composite oxide as its main constituent, and contains $Al_2O_3$ containing Al as the first accessory constituent, and $MO_X$-containing an element M (M is one or more elements selected from among Fe, Co, Ni, Cu, and Zn) as the second accessory.

In addition, the $Al_2O_3$ is added to the main constituent in an amount of 0.02 to 6 parts by mol in terms of Al with respect to 100 parts by mol of the main constituent, and the $MO_X$-containing the second accessory constituent M is added to the main constituent so that the content ratio $\beta/\alpha$ to Al is 0.01 to 0.4 in terms of mots.

In this way, the general formula (A) which satisfies the formulas (1) and (2) can suppress a reduction in the rate of capacitance change of electrostatic capacitance to achieve favorable DC bias characteristics, even when the laminated ceramic capacitor is used under an environment in which a DC bias is applied, and can suppress the occurrence of failures even under high-temperature load for a long period of time, thereby allowing high reliability to be ensured.

The reasons will be mentioned below for the Al content $\alpha$ as the first accessory constituent and the content ratio $\beta/\alpha$ of the second accessory constituent M to the Al to be limited to the ranges of the formulas (1) and (2).

(1) Al Content $\alpha$

When the main constituent including $Ba_mTiO_3$ is allowed to contain a predetermined amount of Al, the synergistic interaction between the Al and the second accessory constituent M contained at the content ratio $\beta/\alpha$ can achieve a balance between DC bias characteristics and reliability. However, when the Al content $\alpha$ is less than 0.02 parts by mol with respect to 100 parts by mol of the main constituent, there is a possibility of increased defective products in a high temperature loading test.

On the other hand, when the Al content $\alpha$ is greater than 6 parts by mol with respect to 100 parts by mol of the main constituent, there is a possibility that the rate of capacitance change of electrostatic capacitance will be increased during the application of a DC bias to cause a significant decrease in dielectric constant, and thus degrade DC bias characteristics.

Therefore, the content of $Al_2O_3$ is adjusted so that the Al content $\alpha$ is 0.02 to 6 parts by mol with respect to 100 parts by mol of the main constituent in the present embodiment.

(2) Content Ratio $\beta/\alpha$

When the main constituent including $Ba_mTiO_3$ is allowed to contain a predetermined amount of second accessory constituent, the synergistic interaction between the second accessory constituent and the Al addition can achieve a balance between DC bias characteristics and reliability. However, when the content ratio $\beta/\alpha$ of the second accessory constituent M to the Al is less than 0.01 in terms of mols, the rate of capacitance change of electrostatic capacitance will be increased during the application of a DC bias to cause a significant decrease in dielectric constant, and thus make it difficult to achieve the desired DC bias characteristics. On the other hand, when the content ratio $\beta/\alpha$ is greater than 0.4 in terms of mols, there is an increased probability of a significant decrease in insulation resistance in the case of high-temperature load for a long period of time, thereby possibly leading to decreased reliability.

Therefore, the content of the second accessory constituent is adjusted so that the content ratio $\beta/\alpha$ of the second accessory constituent M to the Al is 0.01 to 0.4 in terms of molar amounts in the present embodiment.

Thus, the general formula (A) which satisfies the formulas (1) and (2) in this way allows the achievement of a balance between DC bias characteristics and reliability.

It is to be noted that while the compounding molar ratio m between the Ba site and the Ti site in the main constituent is supposed to be 1.000 stoichiometrically, it is possible to avoid affecting the DC bias characteristics and reliability in the range of the compounding molar ratio m from 0.995 to 1.03, i.e., in either a Ba site rich case or a Ti site rich case. Therefore, the compounding molar ratio m is also preferably set within the range mentioned above, if necessary.

Furthermore, according to the present invention, various types of accessory constituents can be added to the extent that no damage is caused to the DC bias characteristics and reliability to the dielectric ceramic composition, and for example, rare-earth elements can be also added from the viewpoint of an improvement in dielectric characteristics and temperature characteristics.

In this case, the dielectric ceramic composition is represented by the following general formula (B).

$$100Ba_mTiO_3+(\alpha/2)Al_2O_3+\beta MO_x+(\gamma/2)R_2O_3 \qquad (B)$$

Further, La, Ce, Pr, Nd, Sm, Eu, Gd, Tb, Dy, Y, Ho, Er, Tm, Yb, and Lu, or combinations thereof can be preferably used as this rare-earth element R.

In addition, the content ($\gamma/2$) of the rare-earth oxide $R_2O_3$ is preferably 0.5 to 3.0 parts by mol, and 1.0 to 6.0 parts by mol in terms of R, with respect to 100 parts by mol of the main constituent, and the present inventors have confirmed that the DC bias characteristics or reliability will not be affected within these ranges.

Furthermore, a portion of Ba in the main constituent may be substituted with Ca or Sr, whereas a portion of Ti therein may be substituted with Zr or Hf.

In this case, the dielectric ceramic composition can be represented by the following general formula (C).

$$100(Ba_{1-x-y}Ca_xSr_y)_m(Ti_{1-w-z}Zr_wHf_z)O_3+(\alpha/2)Al_2O_3+\beta MO_x \qquad (C)$$

Next, a laminated ceramic capacitor manufactured with the use of the dielectric ceramic will be described in detail.

The sole FIGURE is a cross-sectional view schematically illustrating an embodiment of the laminated ceramic capacitor.

The laminated ceramic capacitor has internal electrodes 2a to 2f buried in a ceramic body 10, has external electrodes 3a and 3b formed on both ends of the ceramic body 10, and further has first plating films 4a and 4b and second plating films 5a and 5b formed on the surfaces of the external electrodes 3a and 3b.

More specifically, the ceramic body 10 includes dielectric layers 1a to 1g formed from the dielectric ceramic composition according to the present invention and internal electrode layers 2a to 2f, which are stacked alternately and subjected to firing. The internal electrode layers 2a, 2c, and 2e are electrically connected to the external electrode 3a, whereas the internal electrode layers 2b, 2d, and 2f are electrically connected to the external electrode 3b. Furthermore, electrostatic capacitance is formed between the opposed surfaces of the internal electrode layers 2a, 2c, and 2e and the internal electrode layers 2b, 2d, and 2f.

Next, a method for manufacturing the laminated ceramic capacitor described above will be described in detail.

First, as ceramic raw materials, a Ba compound and a Ti compound are prepared, and if necessary, a Ca compound, a Sr compound, a Zr compound, and a Hf compound are prepared, and the ceramic raw materials are weighed so that the compounding molar ratio m between the Ba site and the Ti site falls within the range of, for example, 0.995 to 1.03.

Then, these weighed materials are put along with balls such as PSZ (Partially Stabilized Zirconia) balls and pure water into a ball mill, subjected to sufficient wet mixing and grinding, and then subjected to calcination at a temperature of 1000° C. or more for synthesis, and to grinding to prepare a main constituent powder.

Next, prepared are $Al_2O_3$ containing Al as the first accessory constituent and $MO_X$ containing M (M is at least one of Fe, Co, Ni, Cu, and Zn) as the second accessory constituent, and furthermore, if necessary, $R_2O_3$ is prepared which contains the rare-earth element R as the third accessory constituent.

Then, the $Al_2O_3$ and the $MO_X$ are weighed so as to satisfy the formulas (1) and (2), and further if employed, an appropriate amount of the $R_2O_3$ is weighed, and the main constituent and accessory constituents are again put along with PSZ balls and pure water into a ball mill for mixing, thereby providing a raw material powder.

Then, the raw material powder combined with an organic binder and an organic solvent added thereto is subjected to wet mixing in a ball mill, thereby preparing a ceramic slurry. Then, this ceramic slurry is subjected to sheet forming with the use of a forming process such as a doctor blade method, thereby providing ceramic green sheets.

Next, a conductive paste for internal electrodes is used to carry out screen printing onto the ceramic green sheets, thereby forming a conductive layer in a predetermined shape on the ceramic green sheets.

It is to be noted that, as the conductive material contained in the conductive paste for internal electrodes, it is preferable, from the viewpoint of a reduction in cost, to use a base metal material containing Ni, Cu, or an alloy thereof as its main constituent.

Then, a predetermined number of the ceramic green sheets with the conductive layers formed thereon are stacked in a predetermined direction to obtain a ceramic laminated body.

Next, this ceramic laminated body is heated to a temperature of 250 to 400° C. to burn off and remove the binder, and then subjected to a firing treatment in a reducing atmosphere including an $H_2$—$N_2$—$H_2O$ gas with an oxygen partial pressure controlled to $10^{-9}$ to $10^{-12}$ MPa. This firing treatment provides co-sintered conductive films and ceramic green sheets, thereby achieving the ceramic body 10 with the internal electrodes 2a to 2f and the dielectric layers 1a to 1g alternately stacked.

Next, a conductive paste for external electrodes is applied onto both end surfaces of the ceramic body 10, and subjected to a baking treatment, thereby forming the external electrodes 3a and 3b.

It is to be noted that, for the conductive material contained in the conductive paste for external electrodes, it is also preferable, from the viewpoint of a reduction in cost, to use a base metal material containing Ni, Cu, or an alloy thereof as its main constituent.

In addition, the conductive paste for external electrodes may be applied onto the both end surfaces of the ceramic laminated body, and then subjected to a firing treatment at the same time with the ceramic laminated body as a method for forming the external electrodes 3a and 3b.

Then, finally, electrolytic plating is applied to form the first plating films 4a and 4b including Ni, Cu, an Ni—Cu alloy, or the like, on the surfaces of the external electrodes 3a and 3b, and further form the second plating films 5a and 5b including solder, tin, or the like on the surfaces of the first plating films 4a and 4b, thereby manufacturing a laminated ceramic capacitor.

As described above, the laminated ceramic capacitor has the dielectric layers 1a to 1g formed from a sintered body of the dielectric ceramic composition, and thus, can ensure favorable DC bias characteristics with the reduced rate of capacitance change of electrostatic capacitance even when a direct-current voltage is applied, and moreover, undergoes no decrease in insulation resistance even under high-temperature load for a long period of time, thereby allowing for the achievement of a laminated ceramic capacitor with high reliability.

Specifically, the achievement of a laminated ceramic capacitor with high reliability is made possible and can suppress the rate of capacitance change of electrostatic capacitance within 60% even when a direct-current voltage of 10 V is applied, and which provides a low rate of failure occurrence even when a voltage of DC 40 V is applied continuously for a long period of 1500 hours under a high temperature of 125° C.

It is to be noted that the present invention is not limited to the embodiment described above. For example, it is also preferable to further add various types of accessory constituents to the extent that no damage is caused to the DC bias characteristics and reliability. For example, it is also preferable to add MnO from the viewpoint of an improvement in resistance to reduction, and add $SiO_2$ from the viewpoint of an improvement in sinterability, or it is also preferable to add $V_2O_5$ or the like appropriately from the viewpoint of an improvement in temperature characteristics. In addition, an embodiment of the combination of the composition formulas (A) to (C) is also possible.

While the main constituent is prepared by a so-called solid-phase synthesis method in the embodiment described above, the main constituent may be prepared by a hydrolysis method, a hydrothermal synthesis method, a coprecipitation method, or the like. Furthermore, also for the starting raw materials such as the Ba compound and the Ti compound, carbonates, oxides, nitrates, hydroxides, organic acid salts, alkoxides, chelate compounds and the like can be selected appropriately depending on the mode of the synthesis reaction.

Next, examples of the present invention will be described specifically.

EXAMPLE 1

First, $BaCO_3$ and $TiO_2$ were prepared as ceramic raw materials, weighed in predetermined amounts, and these weighed materials were then put along with PSZ balls and pure water into a ball mill for mixing, and subjected to calcination to synthesize a composite oxide of a composition formula $Ba_{1.01}TiO_3$, and this composite oxide was subjected to grinding to obtain a main constituent powder.

Next, prepared were $Al_2O_3$ containing Al as the first accessory constituent, $Fe_2O_3$ ($FeO_{3/2}$), CoO, NiO, CuO, and ZnO as $MO_X$ containing the second accessory constituent M, and $Dy_2O_3$ containing Dy as the third accessory constituent R, and further, MnO and $SiO_2$ were prepared.

Then, 0.5 parts by mol of the $Al_2O_3$ (1.0 part by mol in terms of Al), 1.0 part by mol of the $Dy_2O_3$ (2.0 parts by mol in terms of Dy), 0.2 parts by mol of the MnO, and 1.0 part by mol of the $SiO_2$ were each weighed with respect to 100 parts by mol of the main constituent, and further, the $MO_X$ was weighed so that the content ratio β/α of the second accessory constituent M to the Al fell within the range of 0.005 to 0.45 as shown in Table 1.

It is to be noted that the materials were weighed so that in Table 1, the mixing ratio between CoO and NiO is 1:1 in terms of Co and Ni for sample number 26, the mixing ratio between NiO and CuO is 1:1 in terms of Ni and Cu for sample number 27, and the mixing ratio among CoO, NiO, and CuO is 1:2:1 in terms of Co, Ni, and Cu for sample number 28.

In addition, MnO was weighed for sample number 29, so that the MnO content was 0.3 parts by mol in total in terms of Mn with respect to 100 parts by mol of the main constituent, instead of adding the second accessory constituent M. More specifically, the MnO was weighed so that Mn was 0.1 parts by mol and is more excessive than the 0.2 parts by mol mentioned above.

The main constituent and accessory constituents were again put along with PSZ balls and pure water into a ball mill for mixing, thereby providing a raw material powder.

Then, the raw material powder with a polyvinyl butyral based binder and ethanol as an organic solvent added thereto was subjected to wet mixing in a ball mill, thereby preparing a ceramic slurry.

Then, the ceramic slurry was subjected to sheet forming with the use of a doctor blade method, so that the fired dielectric element was 2.0 μm in thickness, thereby providing rectangular ceramic green sheets.

A conductive paste for internal electrodes was prepared which contained Ni as a conductive component. Then, this conductive paste was used to carry out screen printing onto the ceramic green sheets, thereby forming a conductive layer in a predetermined shape on the ceramic green sheets.

Then, a predetermined number of the ceramic green sheets with the conductive layers formed thereon were stacked in a predetermined direction to obtain a ceramic laminated body.

This ceramic laminated body was heated at a temperature of about 400° C. to burn off and remove the binder, and then subjected to firing in a reducing atmosphere including an $H_2$—$N_2$—$H_2O$ gas, thereby providing a ceramic body with internal electrodes buried therein. It is to be noted that the firing was carried out under the firing conditions of maximum temperature: 1220° C., oxygen partial pressure: $10^{-10}$ to $10^{-10.5}$ MPa, and firing time: 3 hours.

Thereafter, a Cu containing conductive paste for external electrodes was prepared, and the conductive paste for external electrodes was applied onto both ends of the ceramic body, and subjected to a baking treatment at a temperature of 800° C., thereby providing samples of sample numbers 1 to 39.

The thus obtained respective samples had external dimensions of 1.6 mm in width, 3.2 mm in length, and 0.85 mm in thickness, the dielectric layers present between the internal electrodes were each 2.0 μm in thickness, and the internal electrodes were each 0.5 μm in thickness. In addition, the effective total number of dielectric layers was 300, and the area of the electrode opposed per layer was 2.1 $mm^2$.

Next, an LCR meter was used to measure the electrostatic capacitance for each of sample numbers 1 to 39, in the case of applying no direct-current voltage and the electrostatic capacitance in the case of applying a direct-current voltage of DC 10 V, and the rate of capacitance change was calculated to evaluate the DC bias characteristics. It is to be noted that the DC bias characteristics were determined as a non-defective product when the rate of capacitance change fell—not greater than 60%.

Furthermore, a high temperature loading test was carried out by applying a voltage of DC 40 V to 100 samples for each of the sample numbers under a temperature of 125° C. for 1500 hours. A sample was determined as a failure when the insulation resistance was 50 kΩ or less after a lapse of 1500 hours, and the number of samples as failures was counted to evaluate the reliability.

Table 1 shows the second accessory constituent M used for sample numbers 1 to 39, the Al content α, the content β of the second accessory constituent M, the content ratio β/α of the second accessory constituent M to the Al, the rate of capacitance change, and the rate of failure occurrence.

TABLE 1

$100BaTiO_3 + (α/2)Al_2O_3 + βMO_x + 1.0Dy_2O_3 + 0.2MnO + 1.0SiO_2$

| Sample No. | M | α | β | β/α | Rate of Capacitance Change (%) | Rate of Failure Occurrence in High Temperature Loading Test (%) |
|---|---|---|---|---|---|---|
| 1 | Fe | 1.0 | 0.01 | 0.01 | −60 | 0 |
| 2 | Fe | 1.0 | 0.05 | 0.05 | −58 | 0 |
| 3 | Fe | 1.0 | 0.1 | 0.1 | −58 | 0 |
| 4 | Fe | 1.0 | 0.2 | 0.2 | −56 | 0 |
| 5 | Fe | 1.0 | 0.4 | 0.4 | −55 | 0 |
| 6 | Co | 1.0 | 0.01 | 0.01 | −58 | 0 |
| 7 | Co | 1.0 | 0.05 | 0.05 | −58 | 0 |
| 8 | Co | 1.0 | 0.1 | 0.1 | −57 | 0 |
| 9 | Co | 1.0 | 0.2 | 0.2 | −56 | 0 |
| 10 | Co | 1.0 | 0.4 | 0.4 | −56 | 0 |
| 11 | Ni | 1.0 | 0.01 | 0.01 | −58 | 0 |
| 12 | Ni | 1.0 | 0.05 | 0.05 | −57 | 0 |
| 13 | Ni | 1.0 | 0.1 | 0.1 | −56 | 0 |
| 14 | Ni | 1.0 | 0.2 | 0.2 | −56 | 0 |
| 15 | Ni | 1.0 | 0.4 | 0.4 | −54 | 0 |
| 16 | Cu | 1.0 | 0.01 | 0.01 | −59 | 0 |
| 17 | Cu | 1.0 | 0.05 | 0.05 | −58 | 0 |
| 18 | Cu | 1.0 | 0.1 | 0.1 | −58 | 0 |
| 19 | Cu | 1.0 | 0.2 | 0.2 | −57 | 0 |
| 20 | Cu | 1.0 | 0.4 | 0.4 | −56 | 0 |
| 21 | Zn | 1.0 | 0.01 | 0.01 | −59 | 0 |
| 22 | Zn | 1.0 | 0.05 | 0.05 | −58 | 0 |
| 23 | Zn | 1.0 | 0.1 | 0.1 | −57 | 0 |
| 24 | Zn | 1.0 | 0.2 | 0.2 | −56 | 0 |
| 25 | Zn | 1.0 | 0.4 | 0.4 | −55 | 0 |
| 26 | Co/Ni (=1/1) | 1.0 | 0.2 | 0.2 | −56 | 0 |
| 27 | Ni/Cu (=1/1) | 1.0 | 0.1 | 0.1 | −56 | 0 |
| 28 | Co/Ni/Cu (=1/2/1) | 1.0 | 0.2 | 0.2 | −55 | 0 |
| 29* | (Mn) | 1.0 | (0.1) | (0.1) | −78 | 1 |
| 30* | Fe | 1.0 | 0.005 | 0.005 | −72 | 2 |

TABLE 1-continued $100BaTiO_3 + (\alpha/2)Al_2O_3 + \beta MO_x + 1.0Dy_2O_3 + 0.2MnO + 1.0SiO_2$

| Sample No. | M | α | β | β/α | Rate of Capacitance Change (%) | Rate of Failure Occurrence in High Temperature Loading Test (%) |
|---|---|---|---|---|---|---|
| 31* | Fe | 1.0 | 0.45 | 0.45 | −55 | 13 |
| 32* | Co | 1.0 | 0.005 | 0.005 | −73 | 1 |
| 33* | Co | 1.0 | 0.45 | 0.45 | −54 | 11 |
| 34* | Ni | 1.0 | 0.005 | 0.005 | −72 | 1 |
| 35* | Ni | 1.0 | 0.45 | 0.45 | −55 | 12 |
| 36* | Cu | 1.0 | 0.005 | 0.005 | −73 | 1 |
| 37* | Cu | 1.0 | 0.45 | 0.45 | −53 | 17 |
| 38* | Zn | 1.0 | 0.005 | 0.005 | −73 | 1 |
| 39* | Zn | 1.0 | 0.45 | 0.45 | −55 | 18 |

*outside the scope of the present invention

Sample number 29, which contained Mn as a substitute without containing the second accessory constituent M according to the present invention, underwent a significant decrease in dielectric constant with a rate of capacitance change of −72%, thereby failing to achieve desired DC bias characteristics.

On the other hand, the second accessory constituent M according to the present invention was used for sample numbers 30 to 39.

However, sample numbers 30, 32, 34, 36, and 38 had an excessively low content ratio β/α of the second accessory constituent M of 0.005, and underwent a significant decrease in dielectric constant with a rate of capacitance change of −72 to −73%, thereby failing to achieve desired DC bias characteristics.

In addition, it is seen that sample numbers 31, 33, 35, 37, and 39 had an excessively high content ratio β/α of 0.45, and are inferior in reliability with a high rate of failure occurrence from 11 to 18% under high-temperature load, although the rate of capacitance change was favorably −54 to −55%. In contrast, it was confirmed that sample numbers 1 to 28 can achieve favorable DC bias characteristics with a rate of capacitance change from −55 to −60%, and moreover, ensure high reliability without causing failures even under high-temperature load for a long period of time, because of the second accessory constituent M according to the present invention being contained, the Al content α being within the scope of the present invention, and moreover a content ratio β/α of 0.01 to 0.4 being within the scope of the present invention.

As is clear from sample numbers 26 to 28, it was also confirmed that a balance between DC bias characteristics and reliability can be achieved even in the case of mixing a plurality kinds of second accessory constituent, as long as the content ratio β/α falls within the scope of the present invention.

EXAMPLE 2

In the same manner as in Example 1, $BaCO_3$ and $TiO_2$ were prepared as ceramic raw materials, weighed in predetermined amounts, then put along with PSZ balls and pure water into a ball mill for mixing, and subjected to calcination to synthesize a composite oxide of a composition formula $Ba_{1.02}TiO_3$, and this composite oxide was subjected to grinding to obtain a main constituent.

Next, $Al_2O_3$, $Fe_2O_3$, CoO, NiO, CuO, and ZnO, $Dy_2O_3$, MnO, $SiO_2$ were prepared as accessory constituents.

Then, 0.1 to 3.0 parts by mol of the $Al_2O_3$ (0.2 to 6.0 parts by mol in terms of Al), 1.25 parts by mol of the $Dy_2O_3$ (2.5 parts by mol in terms of Dy), 0.5 parts by mol of the MnO, and 1.5 parts by mol of the $SiO_2$ were each weighed with respect to 100 parts by mol of the main constituent, and further, the second accessory constituent was weighed so that the content ratio β/α of the second accessory constituent M to the Al was 0.15.

Then, the main constituent and accessory constituents were again put along with PSZ balls and pure water into a ball mill for mixing, thereby providing a raw material powder.

Thereafter, samples of sample numbers 41 to 68 were prepared in accordance with the same method and procedure as in Example 1.

In the same manner as in Example 1, the rate of capacitance change was measured to evaluate DC bias characteristics, and a high temperature loading test was carried out to evaluate reliability.

Table 2 shows the second accessory constituent M used for sample numbers 41 to 68, the Al content α, the content β of the second accessory constituent M, the content ratio β/α of the second accessory constituent M to the Al, the rate of capacitance change, and the rate of failure occurrence.

TABLE 2

$100BaTiO_3 + (\alpha/2)Al_2O_3 + \beta MO_x + 1.25Dy_2O_3 + 0.5MnO + 1.5SiO_2$

| Sample No. | M | α | β | β/α | Rate of Capacitance Change (%) | Rate of Failure Occurrence in High Temperature Loading Test (%) |
|---|---|---|---|---|---|---|
| 41 | Fe | 0.2 | 0.03 | 0.15 | −56 | 0 |
| 42 | Fe | 0.5 | 0.075 | 0.15 | −55 | 0 |
| 43 | Fe | 1.0 | 0.15 | 0.15 | −54 | 0 |
| 44 | Fe | 3.0 | 0.45 | 0.15 | −54 | 0 |
| 45 | Fe | 6.0 | 0.9 | 0.15 | −58 | 0 |
| 46 | Co | 0.2 | 0.03 | 0.15 | −56 | 0 |
| 47 | Co | 0.5 | 0.075 | 0.15 | −55 | 0 |
| 48 | Co | 1.0 | 0.15 | 0.15 | −55 | 0 |
| 49 | Co | 3.0 | 0.45 | 0.15 | −53 | 0 |
| 50 | Co | 6.0 | 0.9 | 0.15 | −58 | 0 |
| 51 | Ni | 0.2 | 0.03 | 0.15 | −57 | 0 |
| 52 | Ni | 0.5 | 0.075 | 0.15 | −56 | 0 |
| 53 | Ni | 1.0 | 0.15 | 0.15 | −54 | 0 |
| 54 | Ni | 3.0 | 0.45 | 0.15 | −54 | 0 |
| 55 | Ni | 6.0 | 0.9 | 0.15 | −59 | 0 |
| 56 | Cu | 0.2 | 0.03 | 0.15 | −56 | 0 |
| 57 | Cu | 0.5 | 0.075 | 0.15 | −55 | 0 |
| 58 | Cu | 1.0 | 0.15 | 0.15 | −55 | 0 |
| 59 | Cu | 3.0 | 0.45 | 0.15 | −54 | 0 |
| 60 | Cu | 6.0 | 0.9 | 0.15 | −59 | 0 |
| 61 | Zn | 0.2 | 0.03 | 0.15 | −56 | 0 |
| 62 | Zn | 0.5 | 0.075 | 0.15 | −56 | 0 |
| 63 | Zn | 1.0 | 0.15 | 0.15 | −54 | 0 |
| 64 | Zn | 3.0 | 0.45 | 0.15 | −57 | 0 |
| 65 | Zn | 6.0 | 0.9 | 0.15 | −59 | 0 |
| 66* | Fe | 6.5 | 0.325 | 0.05 | −78 | 0 |
| 67* | Fe | 6.5 | 0.975 | 0.15 | −73 | 0 |
| 68* | Fe | 6.5 | 2.6 | 0.4 | −70 | 0 |

*outside the scope of the present invention

Sample numbers 66 to 68, had an excessively high Al content α of 6.5 parts by mol with respect to 100 parts by mol of the main constituent, and underwent a significant decrease in electrostatic capacitance (dielectric constant) in the case of applying a direct-current voltage of 10 V with a rate of capacitance change from −70 to −78%, thereby resulting in degraded DC bias characteristics, although the content ratio β/α is 0.05 to 0.40, which is within the scope of the present invention.

In contrast, it was confirmed that sample numbers 41 to 65 achieved favorable DC bias characteristics with a rate of capacitance change from −53 to −59%, and moreover, ensured a high reliability without causing failures even under high-temperature load for a long period of time, because of the Al content α of 0.2 to 6.0 parts by mol with respect to 100 parts by mol of the main constituent within the scope of the present invention, and the use of the element within the scope of the present invention as the second accessory constituent M, and also the content ratio β/α of 0.15 within the scope of the present invention.

EXAMPLE 3

In the same manner as in Example 1, BaCO$_3$ and TiO$_2$ were prepared as ceramic raw materials, these ceramic raw materials were weighed in predetermined amounts, then put along with zirconia balls into a ball mill for mixing, and subjected to calcination to synthesize a composite oxide of a composition formula BaTiO$_3$, and this composite oxide was subjected to grinding to obtain a main constituent.

Next, Al$_2$O$_3$, NiO, and SiO$_2$ were prepared, and further, R$_2$O$_3$ containing R as the third accessory constituent (in the formula, R represents La, Ce, Pr, Nd, Sm, Eu, Gd, Tb, Dy, Y, Ho, Er, Tm, Yb, and Lu) was prepared.

Then, 1.2 parts by mol of the Al$_2$O$_3$ (2.4 parts by mol in terms of Al), 0.15 parts by mol of the NiO, 0.5 to 3.0 parts by mol of the R$_2$O$_3$ (1.0 to 6.0 parts by mol in terms of R), and 1.2 parts by mol of the SiO$_2$ were each weighed with respect to 100 parts by mol of the main constituent. It is to be noted that the content ratio β/α between the Al and the Ni as the second accessory constituent is 0.0625 within the scope of the present invention.

The main constituent and accessory constituents were again put along with PSZ balls and pure water into a ball mill for mixing, thereby providing a raw material powder.

Thereafter, samples of sample numbers 71 to 91 were prepared in accordance with the same method and procedure as in Example 1.

In the same manner as in Example 1, the rate of capacitance change was measured to evaluate DC bias characteristics, and a high temperature loading test was carried out to evaluate reliability.

Table 3 shows the third accessory constituent R used for sample numbers 71 to 91 and the content γ thereof, the Al content α, the Ni content β, the content ratio β/α, the rate of capacitance change, and the rate of failure occurrence.

TABLE 3

100BaTiO$_3$ + (α/2)Al$_2$O$_3$ + βNiO + (γ/2) R$_2$O$_3$ + 1.2SiO$_2$

| Sample No. | R | α | β | β/α | γ | Rate of Capacitance Change (%) | Rate of Failure Occurrence in High Temperature Loading Test (%) |
|---|---|---|---|---|---|---|---|
| 71 | La | 2.4 | 0.15 | 0.0625 | 2.5 | −58 | 0 |
| 72 | Ce | 2.4 | 0.15 | 0.0625 | 2.5 | −58 | 0 |
| 73 | Pr | 2.4 | 0.15 | 0.0625 | 2.5 | −58 | 0 |
| 74 | Nd | 2.4 | 0.15 | 0.0625 | 2.5 | −56 | 0 |
| 75 | Sm | 2.4 | 0.15 | 0.0625 | 2.5 | −56 | 0 |
| 76 | Eu | 2.4 | 0.15 | 0.0625 | 2.5 | −56 | 0 |
| 77 | Gd | 2.4 | 0.15 | 0.0625 | 2.5 | −55 | 0 |
| 78 | Tb | 2.4 | 0.15 | 0.0625 | 2.5 | −55 | 0 |
| 79 | Dy | 2.4 | 0.15 | 0.0625 | 2.5 | −55 | 0 |
| 80 | Y | 2.4 | 0.15 | 0.0625 | 2.5 | −54 | 0 |
| 81 | Ho | 2.4 | 0.15 | 0.0625 | 2.5 | −54 | 0 |
| 82 | Er | 2.4 | 0.15 | 0.0625 | 2.5 | −56 | 0 |
| 83 | Tm | 2.4 | 0.15 | 0.0625 | 2.5 | −56 | 0 |
| 84 | Yb | 2.4 | 0.15 | 0.0625 | 2.5 | −55 | 1 |
| 85 | Lu | 2.4 | 0.15 | 0.0625 | 2.5 | −57 | 1 |
| 86 | Sm | 2.4 | 0.15 | 0.0625 | 6.0 | −59 | 0 |
| 87 | Dy | 2.4 | 0.15 | 0.0625 | 6.0 | −60 | 0 |
| 88 | Er | 2.4 | 0.15 | 0.0625 | 6.0 | −60 | 0 |
| 89 | Sm | 2.4 | 0.15 | 0.0625 | 1.0 | −56 | 0 |
| 90 | Dy | 2.4 | 0.15 | 0.0625 | 1.0 | −56 | 0 |
| 91 | Er | 2.4 | 0.15 | 0.0625 | 1.0 | −55 | 1 |

As is clear from sample numbers 71 to 91, even in the case of containing 1.0 to 6.0 parts by mol of the rare-earth oxide R$_2$O$_3$ as the third accessory constituent in terms of R with respect to 100 parts by mol of the main constituent, favorable DC bias characteristics can be achieved with a rate of capacitance change from −54 to −60%, and desired reliability can be also ensured with a low rate of failure occurrence of 0 to 1% in a high temperature loading test, as long as the Al content α and the content ratio β/α fall within the scope of the present invention.

EXAMPLE 4

BaCO$_3$, CaCO$_3$, SrCO$_3$, TiO$_2$, ZrO$_2$, and HfO$_2$ were prepared as ceramic raw materials, these ceramic raw materials were weighed in predetermined amounts, then put along with PSZ balls and pure water into a ball mill for mixing, and subjected to calcination to synthesize a composite oxide with a portion of Ba substituted with Ca and/or Sr, and further a composite oxide with a portion of Ti substituted with Zr or Hf as shown in Table 4, and these composites oxides were subjected to grinding to obtain a main constituent powder.

Next, Al$_2$O$_3$, Fe$_2$O$_3$, Dy$_2$O$_3$, MnO, and SiO$_2$ were prepared.

Then, 1.0 part by mol of the Al$_2$O$_3$ (2.0 parts by mol in terms of Al), 0.15 parts by mol of the Fe$_2$O$_3$ (0.3 parts by mol in terms of Fe), 1.25 parts by mol of the Dy$_2$O$_3$ (2.5 parts by mol in terms of Dy), 0.5 parts by mol of MnO, and 1.2 parts by mol of the SiO$_2$ were each weighed with respect to 100 parts by mol of the main constituent powder. It is to be noted that the content ratio β/α between the Al and the Fe as the second accessory constituent was adjusted so as to be 0.15 within the scope of the present invention.

Then, the main constituent and accessory constituents were again put along with PSZ balls and pure water into a ball mill for mixing, thereby providing a raw material powder.

Thereafter, samples of sample numbers 101 to 106 were prepared in accordance with the same method and procedure as in Example 1.

Then, the rate of capacitance change was measured to evaluate DC bias characteristics, and a high temperature loading test was carried out to evaluate reliability in the same manner as in Example 1.

Table 4 shows the main constituent composition, the Al content α, the Fe content β, the content ratio β/α, the rate of capacitance change, and the rate of failure occurrence for sample numbers 101 to 106.

TABLE 4

$100A_mBO_3 + (\alpha/2)Al_2O_3 + (\beta/2)Fe_2O_3 + 1.25Dy_2O_3 + 0.5MnO + 1.2SiO_2$

| Sample No. | $A_mBO_3$ | α | β | β/α | Rate of Capacitance Change (%) | Rate of Failure Occurrence in High Temperature Loading Test (%) |
|---|---|---|---|---|---|---|
| 101 | $(Ba_{0.92}Ca_{0.08})_{1.008}TiO_3$ | 2.0 | 0.3 | 0.15 | −57 | 0 |
| 102 | $(Ba_{0.96}Ca_{0.04})_{1.012}TiO_3$ | 2.0 | 0.3 | 0.15 | −57 | 0 |
| 103 | $(Ba_{0.965}Ca_{0.02}Sr_{0.015})_{1.020}TiO_3$ | 2.0 | 0.3 | 0.15 | −53 | 0 |
| 104 | $(Ba_{0.98}Ca_{0.02})(Ti_{0.95}Zr_{0.15})O_3$ | 2.0 | 0.3 | 0.15 | −56 | 0 |
| 105 | $Ba_{1.024}(Ti_{0.95}Zr_{0.15})O_3$ | 2.0 | 0.3 | 0.15 | −57 | 0 |
| 106 | $(Ba_{0.965}Ca_{0.020}Sr_{0.015})_{1.016}(Ti_{0.95}Hf_{0.15})O_3$ | 2.0 | 0.3 | 0.15 | −54 | 0 |

As is clear from sample numbers 101 to 106, it was confirmed that even in the case of substituting a portion of Ba with Ca or Sr and substituting a portion of Ti with Zr or Hf, favorable DC bias characteristics can be achieved with a rate of capacitance change from −54 to −57%, and moreover, high reliability can be ensured without causing failures under high-temperature load for a long period of time, as long as the Al content α and the content ratio β/α fall within the scope of the present invention.

EXAMPLE 5

In the same manner as in Example 1, $BaCO_3$ and $TiO_2$ were prepared as ceramic raw materials, weighed in predetermined amounts, then put along with PSZ balls and pure water into a ball mill for mixing, and subjected to calcination to synthesize composite oxides with varying molar ratios m between the Ba site and the Ti site as shown in Table 5, and these composite oxides were subjected to grinding to obtain a main constituent powder.

Next, $Al_2O_3$, NiO, $Y_2O_3$, $SiO_2$, and $V_2O_5$ were prepared. Then, 1.0 part by mol of the $Al_2O_3$ (2.0 parts by mol in terms of Al), 0.2 parts by mol of the NiO, 2.0 parts by mol of the $Y_2O_3$ (4.0 parts by mol in terms of Y), 1.5 parts by mol of the $SiO_2$, and 0.075 parts by mol of $V_2O_5$ were each weighed with respect to 100 parts by mol of the main constituent powder.

The main constituent and accessory constituents were again put along with PSZ balls and pure water into a ball mill for mixing, thereby providing a raw material powder.

Thereafter, samples of sample numbers 111 to 120 were prepared in accordance with the same method and procedure as in Example 1.

Then, the rate of capacitance change was measured to evaluate DC bias characteristics, and a high temperature loading test was carried out to evaluate reliability in the same manner as in Example 1.

Table 5 shows the molar ratio m between the Ba site and the Ti site, the Al content α, the Ni content β, the content ratio β/α, the rate of capacitance change, and the rate of failure occurrence for sample numbers 111 to 120.

TABLE 5

$100Ba_mTiO_2 + (\alpha/2)Al_2O_3 + \beta NiO + 2.0Y_2O_3 + 1.5SiO_2 + 0.075V_2O_5$

| Sample No. | m | α | β | β/α | Rate of Capacitance Change (%) | Rate of Failure Occurrence in High Temperature Loading Test (%) |
|---|---|---|---|---|---|---|
| 111 | 0.995 | 2.0 | 0.2 | 0.1 | −56 | 0 |
| 112 | 1 | 2.0 | 0.2 | 0.1 | −56 | 0 |
| 113 | 1.004 | 2.0 | 0.2 | 0.1 | −55 | 0 |
| 114 | 1.008 | 2.0 | 0.2 | 0.1 | −55 | 0 |
| 115 | 1.01 | 2.0 | 0.2 | 0.1 | −55 | 0 |
| 116 | 1.012 | 2.0 | 0.2 | 0.1 | −54 | 0 |
| 117 | 1.015 | 2.0 | 0.2 | 0.1 | −55 | 0 |
| 118 | 1.02 | 2.0 | 0.2 | 0.1 | −55 | 0 |
| 119 | 1.024 | 2.0 | 0.2 | 0.1 | −55 | 0 |
| 120 | 1.03 | 2.0 | 0.2 | 0.1 | −54 | 0 |

As is clear from sample numbers 111 to 120, it was confirmed that even in the case of varying the molar ratio m in the range of 0.995 to 1.03, favorable DC bias characteristics can be achieved with a rate of capacitance change from −54 to −56%, and moreover, high reliability can be ensured without causing failures under high-temperature load for a long period of time, as long as the Al content α and the content ratio β/α fall within the scope of the present invention.

In addition, as is clear from Examples 1 to 5, it was understood that a balance between DC bias characteristics and reliability can be achieved even in the case of containing MnO, $SiO_2$, and $V_2O_5$, as long as the Al content and the content ratio β/α fall within the scope of the present invention.

Industrial Applicability

The present invention allows the achievement of a high-dielectric-constant laminated ceramic capacitor which also achieves a balance between DC bias characteristics and reliability under an environment in which a DC bias is applied.

DESCRIPTION OF REFERENCE SYMBOLS 1a to 1g dielectric layer
2a to 2f internal electrode
10 ceramic body

The invention claimed is:
1. A dielectric ceramic composition comprising:
(A) a barium titanate based composite oxide as its main constituent, and comprising
(B) a first accessory constituent comprising at least Al and
(C) at least one second accessory constituent selected from the group consisting of Fe, Co, Cu, and Zn, wherein
(D) the content of the Al is 0.02 to 6 parts by mol with respect to 100 parts by mol of the main constituent, and
(E) the content ratio of the second accessory constituent to the Al is 0.01 to 0.4 in terms of mols.
2. The dielectric ceramic composition according to claim 1, further comprising a rare-earth element.
3. The dielectric ceramic composition according to claim 2, wherein the rare-earth element is at least one element selected from the group consisting of La, Ce, Pr, Nd, Sm, Eu, Gd, Tb, Dy, Y, Ho, Er, Tm, Yb, and Lu.
4. The dielectric ceramic composition according to claim 3, wherein (a) a portion of Ba constituting the main constituent is substituted with at least one of Ca and Sr or (b) a portion of Ti constituting the main constituent is substituted with at least one of Zr and Hf or (c) a portion of Ba constituting the main constituent is substituted with at least one of Ca and Sr and a portion of Ti constituting the main constituent is substituted with at least one of Zr and Hf.

5. The dielectric ceramic composition according to claim 4, wherein the compounding molar ratio between the Ba site and the Ti site constituting the main constituent is 0.995 to 1.03.

6. The dielectric ceramic composition according to claim 1, wherein (a) a portion of Ba constituting the main constituent is substituted with at least one of Ca and Sr or (b) a portion of Ti constituting the main constituent is substituted with at least one of Zr and Hf or (c) a portion of Ba constituting the main constituent is substituted with at least one of Ca and Sr and a portion of Ti constituting the main constituent is substituted with at least one of Zr and Hf.

7. The dielectric ceramic composition according to claim 1, wherein the compounding molar ratio between the Ba site and the Ti site constituting the main constituent is 0.995 to 1.03.

8. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 7.

9. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 6.

10. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 4.

11. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 2.

12. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 1.

13. A dielectric ceramic composition comprising:
a barium titanate based composite oxide as its main constituent, and comprising
a first accessory constituent comprising at least Al and
at least one second accessory constituent selected from the group consisting of Fe, Co, Ni, Cu, and Zn, wherein
the content of the Al is 0.02 to 6 parts by mol with respect to 100 parts by mol of the main constituent, and
the content ratio of the second accessory constituent to the Al is 0.01 to 0.15 in terms of mols.

14. A dielectric ceramic composition comprising:
a barium titanate based composite oxide not containing Ca as its main constituent, and comprising
a first accessory constituent comprising at least Al and
at least one second accessory constituent selected from the group consisting of Fe, Co, Ni, Cu, and Zn, wherein
the content of the Al is 0.02 to 6 parts by mol with respect to 100 parts by mol of the main constituent, and
the content ratio of the second accessory constituent to the Al is 0.01 to 0.4 in terms of mols.

15. A dielectric ceramic composition comprising:
a barium titanate based composite oxide in which an amount up to less than 10 mol % of the Ti in the main constituent is substituted with Zr as its main constituent, and comprising
a first accessory constituent comprising at least Al and
at least one second accessory constituent selected from the group consisting of Fe, Co, Ni, Cu, and Zn, wherein
the content of the Al is 0.02 to 6 parts by mol with respect to 100 parts by mol of the main constituent, and
the content ratio of the second accessory constituent to the Al is 0.01 to 0.4 in terms of mols.

16. The dielectric ceramic composition according to claim 13, wherein the content of the Al is 0.02 to 3 parts by mol with respect to 100 parts by mol of the main constituent.

17. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 13.

18. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 14.

19. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 15.

20. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 15.

21. A laminated ceramic capacitor comprising a ceramic body including dielectric layers and internal electrodes stacked alternately, and external electrodes formed on surfaces of the ceramic body, which are electrically connected to the internal electrodes, wherein
the dielectric layers are formed from a sintered body of the dielectric ceramic composition according to claim 3.

* * * * *